US008667314B2

United States Patent
Yen et al.

(10) Patent No.: US 8,667,314 B2
(45) Date of Patent: Mar. 4, 2014

(54) POWER SWITCHING CIRCUIT OF PORTABLE ELECTRONIC DEVICE

(75) Inventors: Hung-Wei Yen, Taipei (TW); Li-Chih Chiu, Taipei (TW)

(73) Assignee: Pegatron Corporation, Taipei (TW)

( * ) Notice: Subject to any disclaimer, the term of this patent is extended or adjusted under 35 U.S.C. 154(b) by 1044 days.

(21) Appl. No.: 12/640,620

(22) Filed: Dec. 17, 2009

(65) Prior Publication Data

US 2010/0180138 A1 Jul. 15, 2010

(30) Foreign Application Priority Data

Jan. 9, 2009 (TW) .............................. 98100785 A

(51) Int. Cl.
*G06F 1/00* (2006.01)
*H02J 1/00* (2006.01)
*H02J 3/00* (2006.01)
*G06F 3/00* (2006.01)

(52) U.S. Cl.
USPC ................................ 713/324; 307/86; 710/14

(58) Field of Classification Search
USPC ........................ 713/300, 324; 710/14; 307/86
See application file for complete search history.

(56) References Cited

U.S. PATENT DOCUMENTS

| 5,642,517 | A | 6/1997 | Shirota | |
|---|---|---|---|---|
| 6,917,989 | B1 * | 7/2005 | Inoue | 710/2 |
| 2005/0060467 | A1 | 3/2005 | Wieck | |
| 2005/0162017 | A1 * | 7/2005 | Chin et al. | 307/44 |
| 2005/0267999 | A1 * | 12/2005 | Suematsu et al. | 710/14 |
| 2008/0084187 | A1 * | 4/2008 | Cutrona | 320/132 |
| 2008/0172566 | A1 * | 7/2008 | Park | 713/310 |
| 2009/0106568 | A1 * | 4/2009 | James | 713/300 |

FOREIGN PATENT DOCUMENTS

| CN | 101221463 A | 7/2008 |
|---|---|---|
| CN | 101281417 A | 10/2008 |
| TW | 284319 | 8/1996 |
| TW | 200801924 | 1/2008 |

* cited by examiner

*Primary Examiner* — Kim Huynh
*Assistant Examiner* — Brandon Kinsey
(74) *Attorney, Agent, or Firm* — Muncy, Geissler, Olds & Lowe, P.C.

(57) ABSTRACT

A power switching circuit of a portable electronic device is disclosed. The portable electronic device can be coupled to an expansion device. The power switching circuit includes a first power terminal, a second power terminal, a first switch module, a second switch module, and a power pin. The first switch module is coupled to the first power terminal. The second switch module is coupled to the second power terminal. The power pin is coupled to the first switch module and the second switch module, respectively. When the portable electronic device is not coupled to the expansion device, the first switch module and the second switch module are turned off, such that first power provided by the first power terminal and second power provided by the second power terminal fail to be provided for the power pin via the first switch module and the second switch module.

18 Claims, 2 Drawing Sheets

POWER SWITCHING CIRCUIT OF PORTABLE ELECTRONIC DEVICE

CROSS REFERENCE TO RELATED APPLICATIONS

This Non-provisional application claims priority under 35 U.S.C. §119(a) on Patent Application No. 098100785 filed in Taiwan, Republic of China, the entire contents of which are hereby incorporated by reference.

BACKGROUND OF THE INVENTION

1. Field of Invention

The invention relates to a portable electronic device and, more particularly, to a power switching circuit of a portable electronic device.

2. Related Art

With the development of science technology, a portable electronic device has become a necessary tool in people's daily life. However, when the portable electronic device is applied in a special environment, the device needs to satisfy more needs. For example, a military portable electronic device needs to be high-temperature resistant, waterproof, and sand protecting, and it also needs to pass a high-strength anti-collision test and satisfy other needs.

Generally speaking, to emphasize a light, slim, short, and small design of the portable electronic device, unnecessary electronic components are additionally disposed in an expansion device (or called docking station). However, the portable electronic device is generally coupled to the expansion device via a connector having a plurality of pins. If the connector needs to have a waterproof function, the cost is high.

SUMMARY OF THE INVENTION

One objective of this invention is to provide a power switching circuit of a portable electronic device to improve the prior art.

According to one aspect of the invention, the invention provides a power switching circuit of a portable electronic device. The portable electronic device can be coupled to an expansion device. The power switching circuit includes a first power terminal, a second power terminal, a first switch module, a second switch module, and a power pin. The first switch module is coupled to the first power terminal. The second switch module is coupled to the second power terminal. The power pin is coupled to the first switch module and the second switch module, respectively. When the portable electronic device is not coupled to the expansion device, the first switch module and the second switch module are turned off, such that first power provided by the first power terminal and second power provided by the second power terminal fail to be provided for the power pin via the first switch module and the second switch module.

The power switching circuit of the portable electronic device in this invention has a waterproof power pin. Further, the power switching circuit has a plurality of switch modules for controlling the power direction through the power pin thus to charge or discharge via the same power pin. Since the single power pin is used, the cost can be reduced.

These and other features, aspects, and advantages of the present invention will become better understood with regard to the following description, appended claims, and accompanying drawings.

DETAILED DESCRIPTION OF THE INVENTION

Figure 1:
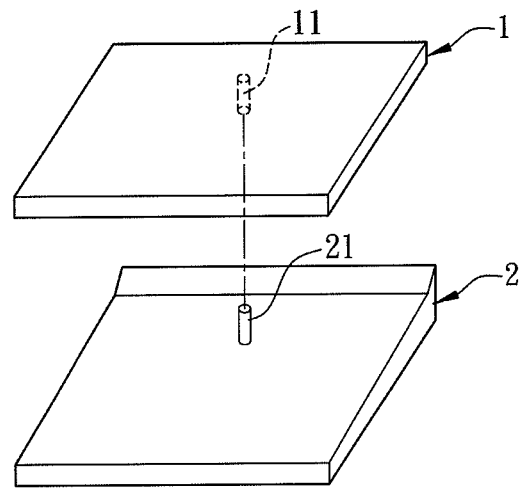
FIG. 1 is a schematic diagram showing a portable electronic device and an expansion device according to one preferred embodiment of the invention.

FIG. 1 is a schematic diagram showing a portable electronic device and an expansion device according to one preferred embodiment of the invention. A portable electronic device 1 in this embodiment includes a power pin 11. The portable electronic device 1 can be coupled to a third power terminal 21 of an expansion device 2 via the power pin 11, such that via the single power pin 11 the portable electronic device 1 can provide power for the expansion device 2 or the expansion device 2 can provide power for the portable electronic device 1.

In this embodiment, the portable electronic device 1 is a portable computer. In other embodiments, the portable electronic device 1 may also be a mobile phone, a personal digital assistant (PDA), a music player and so on. However, the invention is not limited thereto. In this embodiment, the expansion device 2 can also be called docking station. The expansion device 2 may include an optical disk, a heat dissipating fan, and different types of input/output connecting ports. However, the invention does not limit the type of the expansion device 2.

In this embodiment, the power pin 11 is a special pin with a waterproof function. Since the power pin 11 is a special pin, the cost is higher. However, in this embodiment, the single power pin 11 is used for power transmission between the portable electronic device 1 and the expansion device 2. Therefore, the cost can be reduced. In this embodiment, the power pin 11 can be disposed at the bottom of the portable electronic device 1. In other embodiments, the power pin 11 may also be disposed at a side surface of the portable electronic device 1. The invention is not limited thereto.

Figure 2:
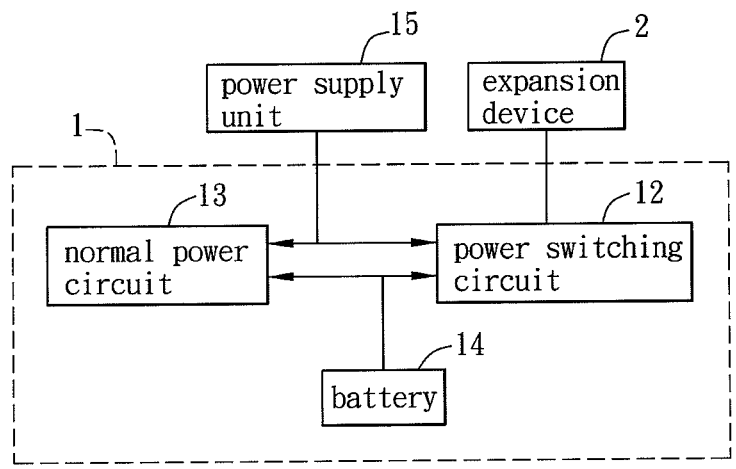
FIG. 2 is a functional block diagram showing a power circuit of a portable electronic device according one preferred embodiment of the invention.

FIG. 2 is a functional block diagram showing the portable electronic device 1 according to one preferred embodiment of the invention. The portable electronic device 1 in this embodiment includes a power switching circuit 12, a normal power circuit 13 and a battery 14. The portable electronic device 1 is coupled to a power supply unit 15. The power switching circuit 12 is coupled to the normal power circuit 13 and the battery 14, respectively. The battery 14 is coupled to the normal power circuit 13 and the power switching circuit 12, respectively. The power supply unit 15 is coupled to the normal power circuit 13 and the power switching circuit 12, respectively. The normal power circuit 13 is coupled to the battery 14, a first power terminal, and a second power terminal of the power switching circuit 12, respectively.

In this embodiment, the battery 14 may be built in the portable electronic device 1, may be detachably installed in the portable electronic device 1, or may be an external battery. In this embodiment, the power supply unit 15 can also be called power adapter which is an external element having one terminal coupled to commercial power and the other terminal coupled to the portable electronic device 1.

In this embodiment, the normal power circuit 13 is used for providing power for various components in the interior of the portable electronic device 1. For example, the normal power circuit 13 may provide power of different power values such as 5 V, 3.3 V, and 1.8 V for the different electronic components.

In this embodiment, when the portable electronic device 1 is not coupled to the expansion device 2, the power switching circuit 12 can disconnect the power supply unit 15 from the power pin 11 and can disconnect the battery 14 from the power pin 11, such that the power pin 11 does not exist power, thus to prevent the exposed power pin 11 from occurring a short circuit. In addition, in this embodiment, the power switching circuit 12 further can switch provision of the power for the expansion device 2 to the battery 14 of the portable electronic device 1 or switch provision of the power for the portable electronic device 1 to the expansion device 2 both via the power pin 11.

Figure 3:
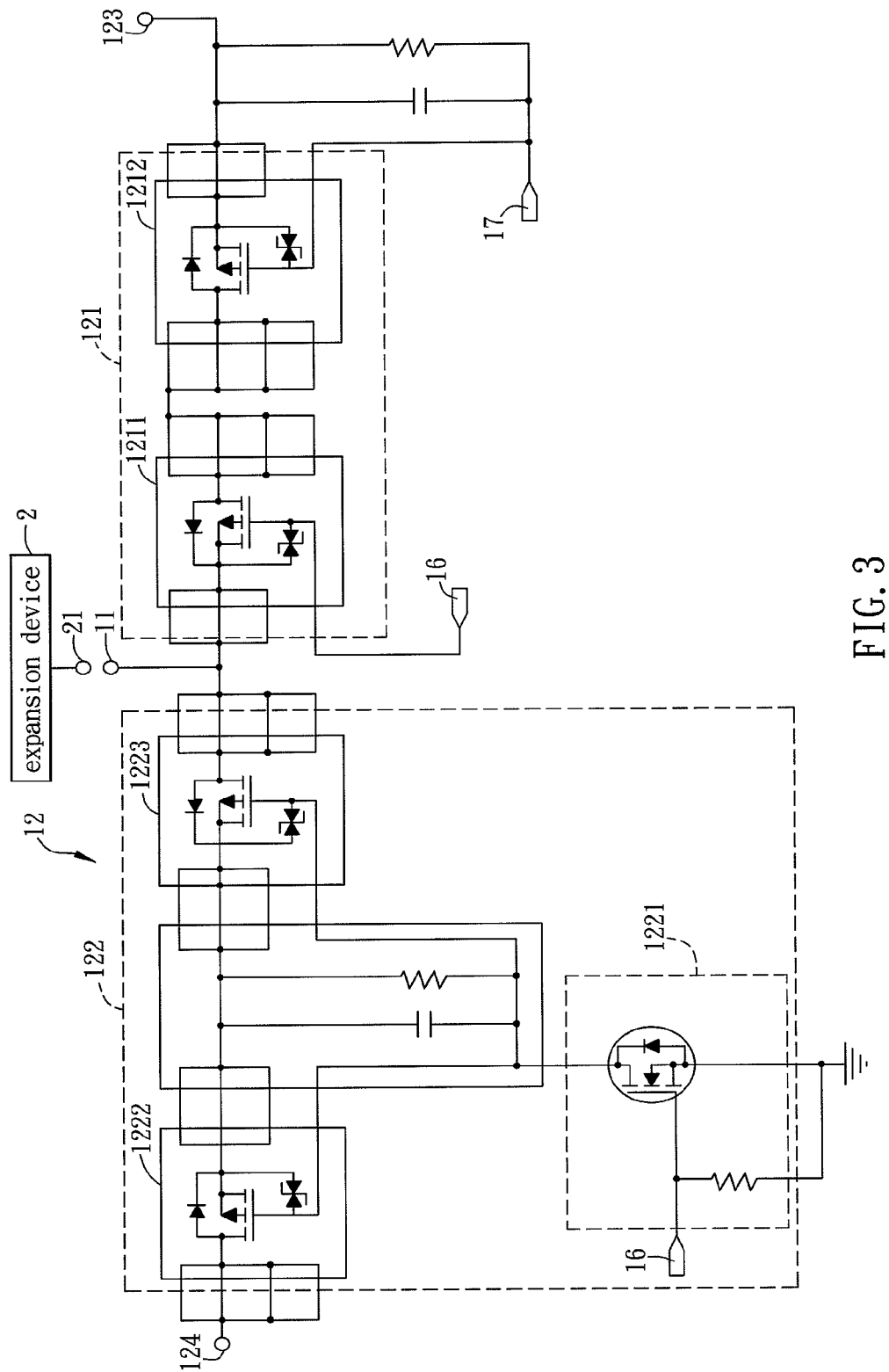
FIG. 3 is a circuit schematic diagram showing a power switching circuit according to one preferred embodiment of the invention.

FIG. 3 is a circuit schematic diagram showing the power switching circuit 12 according to one preferred embodiment of the invention. Please refer to FIG. 2 and FIG. 3 together. In this embodiment, the power switching circuit 12 includes a first switch module 121, a second switch module 122, a first power terminal 123, a second power terminal 124, and a power pin 11. The first switch module 121 includes a first switch unit 1211 and a second switch unit 1212. The second switch module 122 includes a third switch unit 1221, a fourth switch unit 1222, and a fifth switch unit 1223.

The first switch module 121 is coupled to the first power terminal 123. The second switch module 122 is coupled to the second power terminal 124. The power pin 11 is coupled to the first switch module 121 and the second switch module 122, respectively. That is, the power pin 11 is located between the first switch module 121 and the second switch module 122.

The first power terminal 123 can further be coupled to the normal power circuit 13 and the battery 14, such that the battery 14 can provide first power for the normal power circuit 13. The second power terminal 124 can further be coupled to the normal power circuit 13 and the power supply unit 15, such that the power supply unit 15 can provide second power for the normal power circuit 13.

The first switch module 121 is coupled to a first control signal terminal 16 and a second control signal terminal 17, respectively. The second switch module 122 is coupled to the first control signal terminal 16. The first switch unit 1211 is coupled to the second switch unit 1212. The first switch unit 1211 is coupled to the power pin 11, the first control signal terminal 16, and the second switch unit 1212, respectively. The second switch unit 1212 is coupled to the first power terminal 123, the second control signal terminal 17, and the first switch unit 1211, respectively. The first switch unit 1211 is located between the power pin 11 and the second switch unit 1212.

In this embodiment, the first control signal terminal 16 can provide a first control signal in a first state (such as 19 V) or a first control signal in a second state (such as 0 V). Similarly, the second control signal terminal 17 can also provide a second control signal in a first state (such as 0 V) or a second control signal in a second state (such as 12 V or 19 V).

In this embodiment, signals provided by the first control signal terminal 16 are described as follows. When the portable electronic device 1 is coupled to the expansion device 2, if the expansion device 2 provides third power via the power pin 11, the first control signal terminal 16 provides the first control signal in the first state (19 V). When the portable electronic device 1 is coupled to the expansion device 2, if the expansion device 2 does not provide the third power via the power pin 11, the first control signal terminal 16 provides the first control signal in the second state (0 V).

In this embodiment, signals provided by the second control signal terminal 17 are described as follows. When the portable electronic device 1 is coupled to the expansion device 2, the second control signal terminal 17 provides the second control signal in the first state (0 V). When the portable electronic device 1 is not coupled to the expansion device 2, the second control signal terminal 17 provides the second control signal in the second state (12 V or 19 V).

In this embodiment, the states of the first control signal terminal 16 and the second control signal terminal 17 can be controlled by switching switches, sensing circuits, mechanism sensing, or other methods. However, the invention is not limited thereto.

The third switch unit 1221 is coupled to the fourth switch unit 1222 and the fifth switch unit 1223, respectively. The third switch unit 1221 is coupled to the first control signal terminal 16. The fourth switch unit 1222 is coupled to the second power terminal 124. The fifth switch unit 1223 is coupled to the power pin 11, and the fifth switch unit 1223 is located between the fourth switch unit 1222 and the power pin 11. In addition, the fifth switch unit 1223 is also located between the third switch unit 1221 and the power pin 11.

The expansion device 2 further includes a third power terminal 21. The third power terminal 21 can be coupled to the power pin 11. Thereby, the expansion device 2 can provide the third power for the portable electronic device 1 via the third power terminal 21 and the power pin 11. In this embodiment, the third power may be AC or DC. In addition, a connection line (not shown) can be connected to commercial power to provide the third power.

Then, embodiments are used to describe coupling of the portable electronic device 1 and the expansion device 2, power switching, and power providing. Please refer to FIGS. 1 to 3 together.

When the portable electronic device 1 is not coupled to the expansion device 2, the first switch module 121 and the second switch module 122 are turned off, such that the first power provided by the first power terminal 123 and/or the second power provided by the second power terminal 124 fail to be provided for the power pin 11 via the first switch module 121 and the second switch module 122.

For example, in this embodiment, when the portable electronic device 1 is not coupled to the expansion device 2, there are two embodiments.

In a first embodiment, the battery 14 provides the power for the portable electronic device 1. At that moment, the first power terminal 123 has a predetermined voltage (such as 12 V). The voltage of the second power terminal 124 is 0 V. The first control signal provided by the first control signal terminal 16 is in a second state (such as 0 V). The second control signal provided by the second control signal terminal 17 is in a second state (such as 12 V).

The second switch unit 1212 is coupled to the second control signal terminal 17. Since the second control signal provided by the second control signal terminal 17 is in the second state, the second switch unit 1212 is turned off. That is, when the second control signal provided by the second control signal terminal 17 is in the second state, the second switch unit 1212 is turned off, such that the power of the first power terminal 123 fails to be provided for the power pin 11 via the second switch unit 1212 and the first switch unit 1211. Regardless of whether the first switch unit 1211 is turned on or off, since the second switch unit 1212 is turned off, the first power terminal 123 is disconnected from the power pin 11.

Thus, the power pin 11 does not exist power. Besides, the first power terminal 123 can be prevented from being connected with the second power terminal 124, thus to prevent charging of the battery 14 by connecting the battery 14 with the normal power circuit 13 via the second power terminal 124.

In a second embodiment, the power supply unit 15 provides the power for the portable electronic device 1. At that moment, the voltage of the first power terminal 123 is 0 V. The second power terminal 124 has a predetermined voltage (such as 19 V). The first control signal provided by the first control signal terminal 16 is in the second state (such as 0 V). The second control signal provided by the second control signal terminal 17 is in the second state (such as 19 V).

When the second control signal provided by the second control signal terminal 17 is in the second state, the second switch unit 1212 is turned off to disconnect the first power terminal 123 from the power pin 11. The first control signal provided by the first control signal terminal 16 is in the second state (such as 0 V), such that the third switch unit 1221 is turned off further to turn off the fifth switch unit 1223. Thus, the power of the second power terminal 124 fails to be provided for the power pin 11 via the fifth switch unit 1223. Further, since the second switch module 122 is turned off, the second power terminal 124 is disconnected from the power pin 11.

In addition, in this embodiment, when the portable electronic device 1 is coupled to the expansion device 2, there are also two embodiments.

In a first embodiment, when the portable electronic device 1 is coupled to the expansion device 2 via the power pin 11 and the first power terminal 123 provides the first power, the first power terminal 123 has a predetermined voltage (such as 12 V). The voltage of the second power terminal 124 is 0 V. The first control signal terminal 16 provides the first control signal in the second state for the first switch unit 1211 to turn on the first switch unit 1211. The second control signal terminal provides the second control signal in the first state for the second switch unit 1212 to turn on the second switch unit 1212. Therefore, via the above control, the first switch module 121 can be turned on, and the first power terminal 123 can provide the first power for the expansion device 2 via the first switch module 121, the power pin 11, and the third power terminal 21. Thereby, the battery 14 of the portable electronic device 1 can provide the power for the expansion device 2.

At that moment, the first control signal of the first control signal terminal 16 is in the second state. Therefore, the third switch unit 1221 is turned off, such that the fourth switch unit 1222 and the fifth switch unit 1223 are turned off thus to disconnect the power pin 11 from the second power terminal 124.

In a second embodiment, when the portable electronic device 1 is coupled to the third power terminal 21 of the expansion device 2 via the power pin 11 and the expansion device 2 provides the third power via the third power terminal 21, the first switch module 121 is turned off and the second switch module 122 is turned on, such that the third power terminal 21 is connected with the second power terminal 124 via the second switch module 122 and the power pin 11, thus to provide the third power for the second power terminal 124. Thereby, the normal power circuit 13 coupled to the second power terminal 124 can receive the third power from the second power terminal 124, and the normal power circuit 13 can charge the battery 14 with the third power.

Further, when the portable electronic device 1 is coupled to the third power terminal 21 of the expansion device 2 via the power pin 11 and the expansion device 2 provides the third power by the third power terminal 21, the voltage of the first power terminal 123 is 0 V, the voltage of the second power terminal 124 is 0 V, and the voltage of the power pin 11 may be 19 V. The first control signal terminal 16 provides the first control signal in the first state for the first switch unit 1211 to turn off the first switch unit 1211, thus to prevent the third power provided by the expansion device 2 from directly flowing into the first power terminal 123 and to prevent the third power provided by the expansion device 2 from interfering with the first power provided by the battery 14.

In addition, the first control signal terminal 16 further provides the first control signal in the first state for the third switch unit 1221 of the second switch module 122, to turn on the third switch unit 1221 further to turn on the fourth switch unit 1222 and the fifth switch unit 1223 thus to allow the power pin 11 to be connected with the second power terminal 124. Thus, the third power provided by the expansion device 2 via the third power terminal 21 can be provided for the normal power circuit 13 of the portable electronic device 1 via the second power terminal 124.

In the above embodiment, the first switch unit 1211, the second switch unit 1212, the fourth switch unit 1222, and the fifth switch unit 1223 may be P-MOSFETs, and the third switch unit 1221 may be an N-MOSFET. However, the invention does not limit the type of the switch units.

To sum up, the power switching circuit in the embodiment of the invention has a plurality of switch units for controlling the current direction thus to charge or discharge via the single power pin. Further, since the current is high and the single power pin is used, the cost can be saved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A power switching circuit of a portable electronic device, wherein the portable electronic device is capable of being coupled to an expansion device, the power switching circuit comprising:
   a first power terminal;
   a second power terminal;
   a first switch module coupled to the first power terminal;
   a second switch module coupled to the second power terminal; and
   a power pin coupled to the first switch module and the second switch module, respectively,
   wherein when the portable electronic device is not coupled to the expansion device, the first switch module and the second switch module are turned off, such that first power provided by the first power terminal and second power provided by the second power terminal fail to be provided for the power pin via the first switch module and the second switch module,
   wherein the portable electronic device further comprises a normal power circuit, a battery and a power supply unit, and one terminal of the normal power circuit and the battery are coupled to the power switching circuit via the first power terminal, and another terminal of the normal power circuit and the power supply unit are coupled to the power switching circuit via the second power terminal.

2. The power switching circuit according to claim 1, wherein when the portable electronic device is coupled to the expansion device via the power pin and the first power terminal provides the first power, the first switch module is turned on, such that the first power terminal provides the first power for the expansion device via the first switch module and the power pin.

3. The power switching circuit according to claim 1, wherein the second power terminal is coupled to the normal power circuit to provide the second power for the normal power circuit.

4. The power switching circuit according to claim 3, wherein the first power terminal is coupled to the normal power circuit to provide the first power for the normal power circuit.

5. The power switching circuit according to claim 1, wherein the expansion device further comprises a third power terminal, and when the portable electronic device is coupled to the third power terminal of the expansion device via the power pin and the third power terminal provides third power, the first switch module is turned off and the second switch module is turned on, such that the third power terminal is connected with the second power terminal via the second switch module and the power pin to provide the third power for the second power terminal.

6. The power switching circuit according to claim 5, wherein the normal power circuit receives the third power from the second power terminal, and the normal power circuit charges the battery with the third power.

7. The power switching circuit according to claim 1, further comprising a first control signal terminal and a second control signal terminal, the first switch module coupled to the first control signal terminal and the second control signal terminal, respectively, the second switch module coupled to the first control signal terminal.

8. The power switching circuit according to claim 7, wherein the first control signal terminal provides a first control signal in a first state or a first control signal in a second state.

9. The power switching circuit according to claim 8, wherein when the portable electronic device is coupled to the expansion device, if the expansion device provides third power via the power pin, the first control signal terminal provides the first control signal in the first state.

10. The power switching circuit according to claim 8, wherein when the portable electronic device is coupled to the expansion device, if the expansion device does not provide third power via the power pin, the first control signal terminal provides the first control signal in the second state.

11. The power switching circuit according to claim 7, wherein the second control signal terminal provides a second control signal in a first state or a second control signal in a second state.

12. The power switching circuit according to claim 11, wherein when the portable electronic device is coupled to the expansion device, the second control signal terminal provides the second control signal in the first state.

13. The power switching circuit according to claim 11, wherein when the portable electronic device is not coupled to the expansion device, the second control signal terminal provides the second control signal in the second state.

14. The power switching circuit according to claim 1, further comprising a first control signal terminal, the first switch module including a first switch unit and a second switch unit, the first switch unit coupled to the first control signal terminal and coupled between the power pin and the second switch unit, when the portable electronic device is coupled to the expansion device and the expansion device provides third power via the power pin, the first control signal terminal providing a first control signal in a first state for the first switch unit to turn off the first switch unit.

15. The power switching circuit according to claim 1, further comprising a first control signal terminal and a second control signal terminal, the first switch module including a first switch unit coupled to the first control signal terminal and a second switch unit coupled to the second control signal terminal, when the portable electronic device is coupled to the expansion device and the first power terminal provides the first power, the first control signal terminal providing a first control signal in a second state for the first switch unit to turn on the first switch unit, and the second control signal terminal providing a second control signal in a first state for the second switch unit to turn on the second switch unit.

16. The power switching circuit according to claim 1, further comprising a first control signal terminal, the second switch module including a third switch unit, the first control signal terminal coupled to the third switch unit.

17. The power switching circuit according to claim 16, wherein when the portable electronic device is coupled to the expansion device and the expansion device provides third power via the power pin, the first control signal terminal provides a first control signal in a first state for the third switch unit, such that the third switch unit is turned on and the power pin is connected with the second power terminal.

18. The power switching circuit according to claim 16, wherein when the portable electronic device is coupled to the expansion device and the expansion device does not provide third power via the power pin, the first control signal terminal provides a first control signal in a second state for the third switch unit, such that the third switch unit is turned off and the power pin is disconnected from the second power terminal.

* * * * *